Patented Apr. 29, 1924.

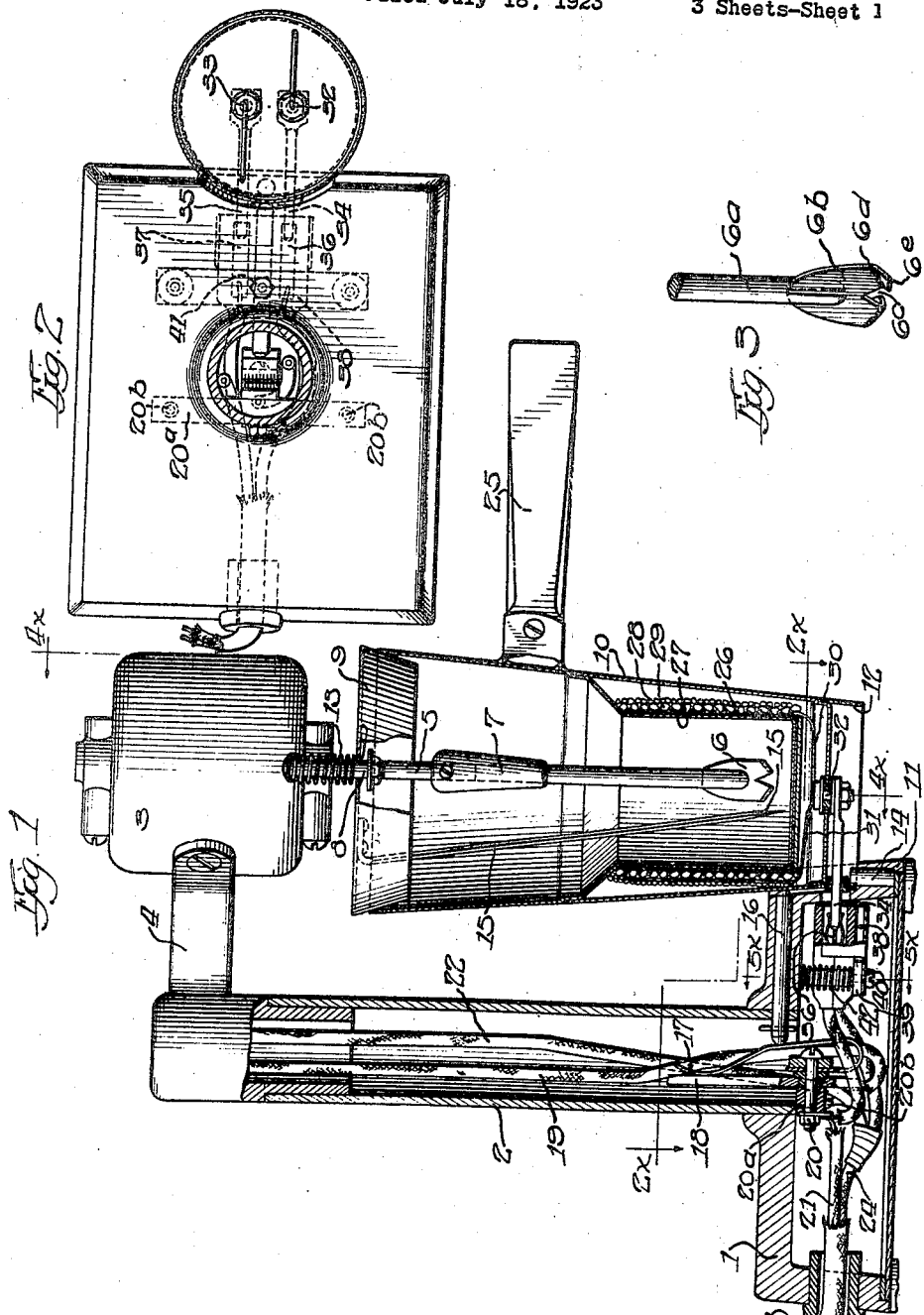

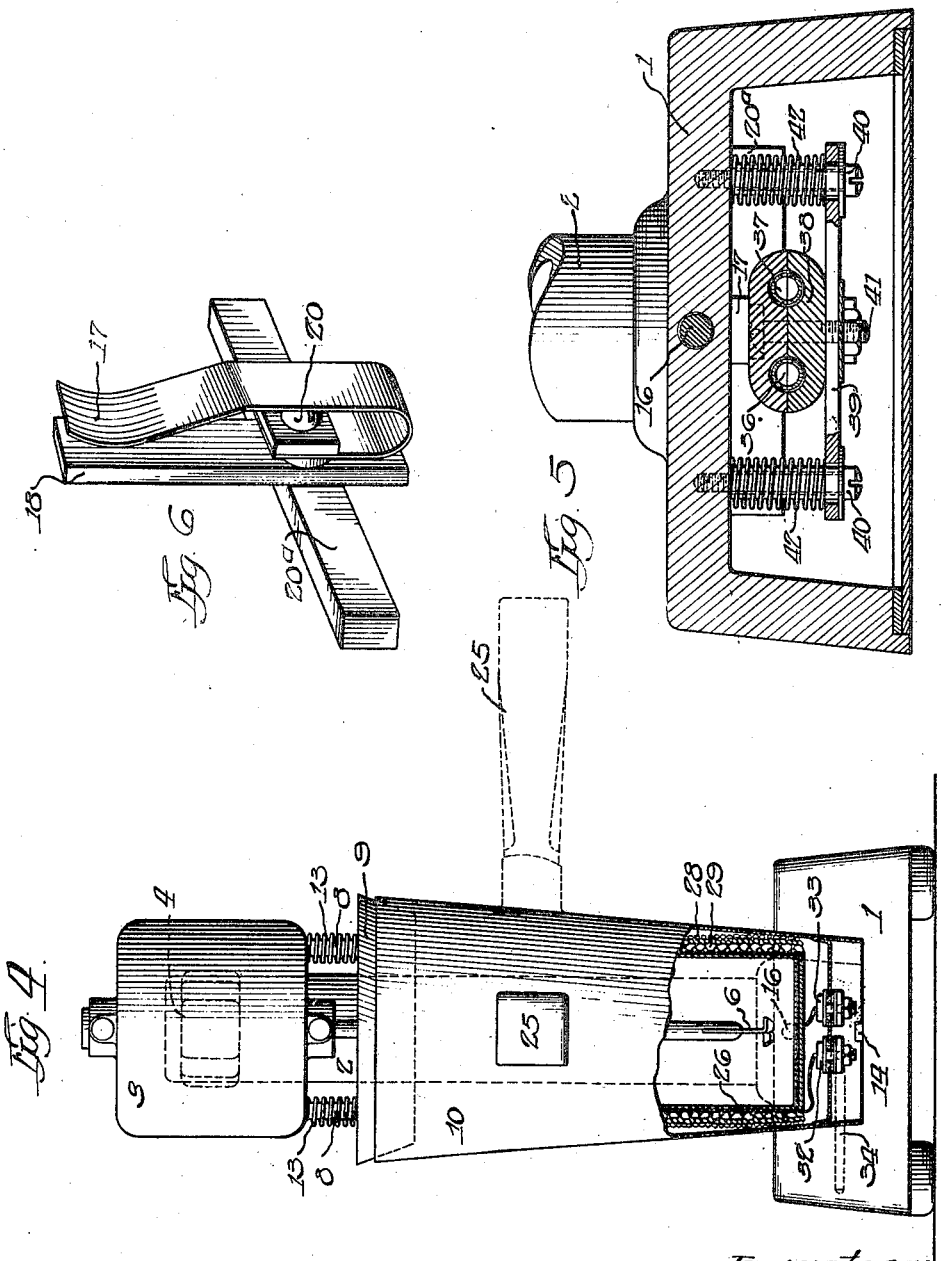

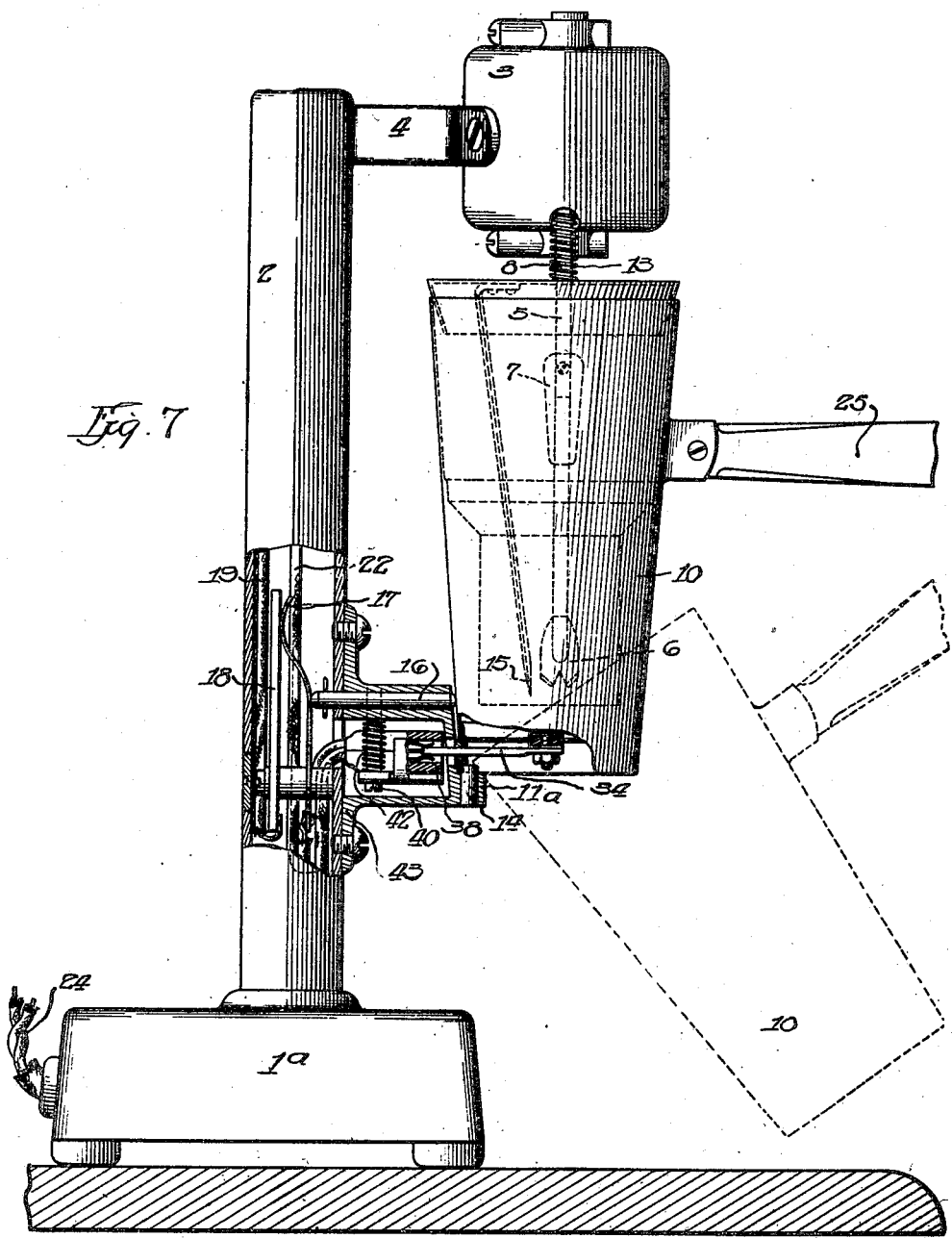

1,491,991

UNITED STATES PATENT OFFICE.

FRANK R. LACY AND JULIUS H. KARLSON, OF CHICAGO, ILLINOIS, ASSIGNORS TO THE KARLAC COMPANY, OF CHICAGO, ILLINOIS, A CORPORATION OF ILLINOIS.

BEVERAGE MIXER AND HEATER.

Application filed July 18, 1923. Serial No. 652,216.

*To all whom it may concern:*

Be it known that we, FRANK R. LACY and JULIUS H. KARLSON, citizens of the United States, residing, respectively, at Chicago, in the county of Cook and State of Illinois, and at Chicago, in the county of Cook and State of Illinois, have jointly invented certain new and useful Improvements in Beverage Mixers and Heaters, of which the following is a specification.

This invention relates to apparatus for use in simultaneously stirring, by mechanical means, and heating, by an electrical resistance unit, the contents of a container having an electric heating element incorporated in its construction and especially constructed for simultaneous association with a positively driven agitator, with means for supplying electric current to its heating element, and means for setting in operation the element that drives the agitator.

It has long been proposed to provide a cup or other container with an electric heating element, and means whereby such element is introduced into an electric circuit by the act of placing the cup upon a stand or base especially constructed to receive it. It has also been proposed to associate an electric heating element outside of the cup with a stand on which is mounted an agitating device, and to bring the cup simultaneously into relation with the agitator and the heater so that the absorption of heat takes place simultaneously with the stirring of the contents of the cup. Moreover, it has been proposed to effect, by different arrangements, the automatic closing of a circuit including the agitating motor of a drink mixer as an incident to vertical relative movement of the agitator and the cup by which they are brought into position for cooperation. But all such devices, where both the functions of heating and stirring have been involved, require unduly complicated apparatus as well as undue and inconvenient manipulation on the part of the operative; and it is the object of the present invention to greatly simplify the construction of apparatus through means of which these old results may be obtained and at the same time to produce what is essentially a one hand apparatus, and one which will leave the other hand of the operator free for other purposes at the time he is engaged, for instance in preparing and delivering beverages over a counter.

The present invention proceeds upon the principle of assembling the agitator and liquid container by relative vertical movement, the agitator and its appurtenant parts being preferably stationary and the container being lifted into the agitator, and thereafter, or simultaneously therewith, bringing the container into circuit closing relation with the current supplying means by a lateral movement or one substantially transverse to that which assembles the agitator and container; means for releasing power to the agitator being preferably likewise controlled by the said lateral or transverse movement of the container. As an incident to the preferred means for realizing the foregoing principle, the support which the container encounters and engages in the act of completing the heating circuit and closing the agitator circuit, is a mere ledge or step receiving but a portion of the base of the container, but nevertheless releasably engaging the same so that the container is very readily thrust into or withdrawn from a position which results in the functioning of the several elements, by single hand manipulation of the container, and with great ease and rapidity.

The invention consists in means hereinafter illustrated and particularly pointed out in the claims.

In the accompanying drawings, in which two embodiments of the invention are shown by way of illustration—

Figure 1 is a vertical axial section of a combined mixing and heating apparatus for beverages.

Figure 2 is a section of the same on the line 2×—2× of Figure 1.

Figure 3 is a detail view of the stirring end of the agitator that is preferably employed.

Figure 4 is an end elevation, partly in section, of the apparatus as seen from the right of Figure 1, and suggesting by dotted lines the rotation of the container 90° from the position of Figure 1 for the purpose of securing agitating effect of the apparatus, minus the heating effect.

Figure 5 is a section on the line 5×—5× of Figure 1, on an enlarged scale.

Figure 6 is a detail view of the motor closing switch minus the thrust rod to be encountered by the container.

Figure 7 is a side elevation, partly in section, of an apparatus corresponding substantially to Figures 1 to 5 in operation and general construction, but modified with respect to the form of stand upon which the apparatus is mounted.

Referring to Figures 1 to 5, 1 represents a base carrying a standard 2 in fixed relation thereon, and 3 represents an electric motor supported through an arm 4 in stationary relation to the upper end of said standard. The depending shaft 5 of motor 3 carries an agitator 6, preferably releasably united thereto through means of the check or sleeve 7. Also depending from the motor 3 or its shell is a pair of headed studs 8 supporting a closure 9 for a cup or equivalent container 10. Base 1 is formed with a step 11 that receives a marginal portion of the base 12 of the cup, so that by raising the cup upward to a position in which it receives and surrounds the agitator 6 and fits upon the cover 9, and then moving the cup inwardly to bring its inner margin over the step 11, the cup will be secured in position to cooperate with the agitator. Cover 9 is preferably of frusto-conical form so that it will readily be received into the mouth of the cup, and it is normally depressed by spring 13 surrounding the studs 8 so that it becoms a means for firmly pressing the cup upon its step 11. A pin 14, or other means providing a projection from the step 11 in position to engage within the flange-like base 12 of the cup, releasably secures the cup to its step until intentionally removed by a slight lifting of the cup.

Mounted upon the cover 9 in position to enter the cup with the agitator is a combined guard and dividing spur 15 that extends down approximately the same distance as the agitator and serves two important functions. First, it acts as a stationary element which breaks up the vortex of the stirred liquid of the cup, subdividing any solid matter that may be introduced for mixing, and deflecting the ingredients in a manner to insure more rapid and perfect mixture or homogenizing of the contents. Secondly, the spur 15 serves as a resilient guard to necessitate lowering the cup and prevent striking the agitator 6 in careless handling of the cup when it is being removed from the apparatus.

Studs 8 are preferably two in number, as shown in Figure 4, so that the cover is prevented from rotating about a vertical axis, and the spur 15 is kept in predetermined relation to the agitator 6. The studs 8 will leave the cover free to rock upon a horizontal axis intersecting the studs at least to a degree that will enable the cover 9 to conform to the mouth of the cup in different angular positions of the cup.

An important feature of the preferred embodiment of the present invention resides in the fact that the cup is seated in a position eccentric to the axis of the shaft 5, so that the agitator 6 is brought nearer to one side of the cup than to the other, with the result that solid matter, such, for instance, as a body of ice cream, introduced into the cup for mixing with fluid contents is drawn by the vortex between the agitator and the wall of the cup and thus more rapidly disintegrated. Another important feature incident to the preferred embodiment is the coaction between the stationary sub-dividing spur 15 and the agitator, and particularly when the agitator is eccentrically located, as described.

16 represents a plunger that normally extrudes in position to be impinged against and displaced inwardly by the cup 10 when the latter reaches its position upon the step 11, and this plunger controls a spring contact arm 17 within the standard 2 which coacts with a fixed conducting piece 18 forming part of one of the conductors 19 which supply the motor 3 with electric current. Spring arm 17 is connected through a suitably insulated bolt 20 with one of the leading in wires 21 of the electric supply cord. These parts 17, 18, and 20 are conveniently mounted upon cross bar 20ª (see Figures 5 and 6) which is supported in the base 1 by any suitable means, such, for instance, as screws 20ᵇ shown in Figure 2. Return wire 22 of the motor 3 connects with the other wire 24 of the supply cord. From so much of the description it will be seen that the cup 10 is adapted for one hand manipulation and by grasping the cup or gripping its handle 25, may be rapidly brought into position receiving the agitator 6 and resting upon the step 11 by almost a single continuous movement, and when in said position it will automatically close the circuit through the agitating motor.

In order to heat the contents of the cup simultaneously with agitating it, when a hot drink is to be served, the cup, or some of the cups supplied for use in connection with the apparatus, will be equipped with a heating element 26, preferably consisting of a wire wound around the reduced portion 27 of the cup and insulated and spaced by asbestos cords 28, 29, or other suitable insulator; and this heating element will have its end leads 30, 31, connected through binding screws 32, 33 (Figure 2) with terminals 34, 35 that enter the sockets 36, 37 of the outlet receptacle 38, so positioned in the base 1 that the terminals 34, 35 will enter into electrical contact with the sockets by the mere act of placing the cup in position upon its step 11. The sockets 36, 37 of receptacle 38 (as shown in Figures 1 and 2) are wired, respectively, to the bolt 20 of the conductor 21 and the return wire 24.

An important feature of the preferred embodiment of the circuit closing outlet block 38 resides in the manner of supporting this element in the base 1, which consists essentially of a cross bar 39 loosely supported upon a pair of bolts 40 depending from the base 1, and upon which cross bar the outlet block is suitably secured, as, for instance, by means of their coupling bolt 41 (Figures 2 and 5). Springs 42 constantly pressing the cross bar 39 down upon the heads of the bolts 40 present the sockets 36, 37 in proper position to receive the terminals 34, 35 but leave the block free to move vertically within limits with the cup 10 as the latter moves into and out of its seat behind the retaining pin 14.

As shown in Figure 4, the cup may be assembled with the apparatus in a position at right angles to that shown in Figure 1 without introducing the terminals 34, 35 into the sockets 36, 37, and thus mix a beverage without heating the same. Similarly, cups equipped for assembly with the apparatus, and minus the heating element and the terminals, may be employed for mixing cold beverages. By either method the plunger 16 will be displaced inwardly to close the circuit of the agitating motor.

The base 1 of Figures 1, 2, 4 and 5, and the means of supporting the cup thereon, are designed for use on a counter or support where the apparatus can be set near enough to the edge to render available ample space for moving the cup upward and downward in relation to the apparatus. Where it is desired to locate the apparatus otherwise than near the edge of the table or support, the mounting as shown in Figure 7 may be employed, wherein the step 11ª for the cup 10, equipped with the same pin 14, circuit closing plunger 16, and outlet block 38, will be mounted through the medium of a bracket 43 upon the standard 2 a sufficient distance above the base 1ª to allow room for disengaging the cup 10 from the agitator 6 and spur 15. It is to be understood that in assembling and disassembling the cup 10 with the apparatus shown in Figure 7, the movement of the cup to and from the apparatus will be in a combined vertical and horizontal or arcuate path as suggested by dotted lines in said figure.

The agitator that is preferably used in the apparatus is shown in detail in Figure 3, and consists in a shaft 6ª, a pair of diametrically related blades 6ᵇ increasing in radius downwardly, constructed with a bifurcation 6ᶜ at bottom, the members of which are deflected from the plane of the blades on inclined lines 6ᵈ to provide displacing steps 6ᵉ. The effect of this particular form of agitator is to develop not only a violent vertical action in the contents of the cup, but to displace the contents downwardly as well as outwardly, and thus induce a circulation downwardly at the center and upwardly along the walls of the cup, thereby greatly hastening the absorption of heat units from the surrounding heating element and preventing the burning of the contents. An apparatus constructed as disclosed herein, has been found to bring the contents of the cup from normal atmospheric temperature to the boiling point in about one minute, which is a very essential achievement in mixers for beverages sold over the counter, because of the inconvenience and consequent disaffection of trade resulting from undue delay in delivering a hot beverage when called for.

The time within which the contents can be brought to high temperature in the cup herein described is greatly reduced by the particular construction of cover described, the frusto-conical form of which adapts it to fit tightly in the open end of the cup and greatly reduce the loss of heat units by escape of vapors from the contents of the cup, the springs however, relieving any pressure that might accumulate beyond that which can slowly escape around the studs through which the cover is mounted. This form of cover, by insuring a tight fit, likewise reduces to a great extent the priming or churning over of the contents of the cup. Moreover the frusto conical form greatly facilitates assembly of the cup with the cover at different angles at which the cup may be presented. Finally, the presence of the cover renders the service conducted by means of the described apparatus very much more sanitary in that it excludes foreign matter from the cup.

We claim:

1. In a liquid mixing apparatus, a power driven agitator, a cup adapted to be assembled with said agitator, means engaging and positioning the upper end of the cup relatively to the agitator, a step receiving said cup by a relative lateral movement of the cup after assembly of the cup with the agitator and said means, and a power releasing element actuated by said lateral movement.

2. In a liquid mixing apparatus, a power driven agitator, a cup adapted to be assembled with said agitator, means engaging and positioning the upper end of the cup relatively to the agitator, a step receiving said cup by a relative lateral movement of the cup after assembly of the cup with the agitator and said means, and a power releasing element actuated by said lateral movement; the engaging and positioning means being supported with freedom to shift with the cup in said lateral movement.

3. In a liquid mixing apparatus, a power driven agitator, a cup adapted to be assembled with said agitator by relative movement in the direction of the axis of the agitator, a step adapted to receive and support said cup by relative movement lateral to the cup after completion of such assembly, and a power releasing element actuated by the cup only during said lateral movement.

4. In a liquid mixing apparatus, a power driven agitator, a cup adapted to be assembled with said agitator by relative movement in the direction of the axis of the agitator, a step adapted to receive the lower end of said cup by lateral movement of said lower end after such assembly, and a power releasing element pressed by said lateral movement; said step and cup being adapted to releasably interengage and resist reversal of said lateral movement.

5. In a liquid mixing apparatus, a power driven agitator, a cup adapted to be assembled with said agitator by movement of the cup in the direction of the axis of the agitator, a supporting step over which the cup is moved by lateral movement of the lower end of the cup, after such assembly, a power releasing element engaged by the cup in said lateral movement, and means embracing the upper end of the cup in such assembly, which means is angularly movable to permit said lower end to effect such lateral movement.

6. In mixing apparatus, an agitator, a cup adapted to be assembled with said agitator by vertical movement of the cup relatively to the agitator, said cup being constructed with an electric heating element, a circuit closer for said heating element, and said circuit closer being adapted to be actuated by a transverse movement of the cup after it has surrounded the agitator.

7. In mixing apparatus, a support, an agitator, a cup adapted to be assembled with the agitator by an upward movement relatively thereto, and a circuit closer adapted to be actuated by movement of the cup transverse to its said assembling movement after such assembly; said circuit closer comprising mating elements mounted respectively upon the support and the cup, one of said elements being mounted with freedom of yielding vertically.

8. In mixing apparatus, a support and agitator mounted on said support, a cup adapted to be assembled with the agitator by an upward movement of the cup relatively thereto, a step receiving the lower end of the cup by lateral movement thereof, and a circuit closer actuated by said lateral movement; said step and cup being constructed to interengage by vertical movement after said lateral movement, and said circuit closer comprising mating elements mounted respectively upon the cup and the support with one of said elements free to yield vertically with the movement of the cup that interengages it with the step.

9. In liquid mixing apparatus, a support, an agitator mounted on said support, a cup adapted for assembly with said agitator, a step for supporting said cup in assembled position, a circuit closer element carried by the cup, a mating circuit closer element, and means for mounting the last-named element upon the support, comprising a pin which sustains said element with freedom of limited vertical movement and a spring yieldingly holding said element in position to receive the circuit closer element carried by the cup.

10. In combination, a support, an agitator mounted on said support, a cover carried by said support, a cup adapted to assemble with said agitator and engage said cover by an upward movement of the cup and to be sustained at its upper end by embrace between said cover and cup, and a step receiving the lower end of said cup by lateral movement of said lower end after completion of said assembly; said cover being constructed to permit such lateral movement while in said embrace.

11. In combination, a support, a cover yieldingly carried by said support, a cup adapted to engage said cover by an upward movement and to be sustained at its upper end by entering into embrace with said cover, and a step receiving the lower end of said cup by lateral movement of said lower end after said embrace; said cover and step each holding the cup in engagement with the other.

12. In combination, a support, a cover yieldingly carried by said support, a cup adapted to engage said cover by an upward movement and to be sustained at its upper end by said cover, and a step receiving the lower end of said cup by lateral movement and sustaining the cup in engagement with the cover; the step and cup being adapted to interengage by relative vertical movement permitted by the yielding of the cover.

13. In combination, a support, a cover carried by said support, a cup adapted to engage said cover by an upward movement and to be sustained at its upper end by such engagement, a step receiving the lower end of said cup by lateral movement and sustaining the cup in its engagement with the cover, and a circuit closer actuated by said lateral movement.

14. In a liquid mixer, an agitator, a cup adapted to be assembled with said agitator by upward movement of the cup, a cover adapted to be engaged by the cup by said upward movement and to position the upper end of the cup with relation to the agitator, and a step positioned to receive the cup by lateral movement of the lower end of the cup after such assembly is completed, and constructed to interengage with the cup by downward movement of the cup after such lateral movement; said cover having means for yieldingly pressing the cup downward upon the step.

15. In combination, a support, an agitator mounted on said support, a cup cover, a pair of studs mounting said cover upon said support and holding it against rotation in a horizontal plane, a cup adapted to engage said cover by upward movement, and a step adapted to receive and engage a marginal portion of the lower end of the cup, by horizontal movement, and to hold the cup in engagement with the cover.

16. In combination, a support, an agitator mounted on said support, a cup cover, a pair of studs mounting said cover upon said support and holding it against rotation in a horizontal plane, a cup adapted to engage said cover by upward movement, and a step adapted to receive and engage a marginal portion of the lower end of the cup, by horizontal movement, and to hold the cup in engagement with the cover; said cover having limited vertical movement upon said studs and said studs carrying springs for normally pressing said cover downwardly.

17. In combination, a support, an agitator mounted on said support, a cup adapted to be assembled with said agitator, and a cover adapted to engage said cup when so assembled and positioned to hold the cup in eccentric relation to the agitator; said cover also carrying a spur in position to project into the cup between a wall of the cup and the agitator.

18. In a liquid mixer, a support, an agitator mounted on said support, a cup adapted for assembly with said agitator, a cover for said cup adapted to position the cup with relation to the agitator, and a spur carried by said cover and presented into the cup when the cup is assembled with the agitator; said cover and, through it, the spur being yieldingly mounted on the support.

19. In apparatus of the character described, a fixed support, a cover mounted on said fixed support, a cup adapted to be assembled with said cover and a step receiving said cup by lateral movement of the cup after said assembly; said cover having a frusto-conical rim by which it engages said cup.

20. In apparatus of the character described, a fixed support, a cover mounted on said fixed support, and a cup adapted to be assembled with said cover; said cover being mounted to rock upon its mounting in receiving the cup, and being constructed with a frusto-conical rim which facilitates its entry into the cup.

21. In apparatus of the character described, the combination of a support, a cover mounted on said support with vertical movement, springs normally depressing said cover on its support, and a cup adapted to be assembled with the cover by vertical movement; said cover having a frusto-conical rim by which it engages within the cup.

22. In apparatus of the character described, a support, a rotary agitator mounted on said support, a cup adapted to be assembled with said agitator, and means for supporting the cup in its assembled relation; the agitator being constructed with a stirring end comprising a pair of diametrically related flat blades increasing in radial dimension downwardly and having their lower ends deflected in opposite directions from the plane of the blades.

23. In an apparatus of the character described, the combination of a support, an agitator mounted on said support, a cup adapted to be assembled with said agitator, means carried by said support for holding the cup in its assembled relation, including a step with which the cup engages by a lateral movement, and a circuit closer comprising mating members carried respectively by the cup and support, which are brought together by said lateral movement; the step being adapted to engage the cup and sustain it in assembly with the agitator in a position of rotation of the cup in addition to that which brings together the circuit closer members, thereby permitting assembly without affecting the circuit closer when desired.

24. In an apparatus of the character described, a support, an agitator mounted on said support, a cup adapted to be assembled with said agitator, and a step carried by the support for holding the cup in such assembly, and a circuit closer for controlling the agitator, mounted on said support in position to be actuated by the cup when in assembly with the agitator, a heating element for the cup, and a second circuit closer also adapted to be actuated by the cup when in such assembly at one position of horizontal rotation of the cup, and left unaffected by the cup when the latter is in another position of horizontal rotation.

Signed at Chicago, Illinois, this 16th day of July, 1923.

FRANK R. LACY.
JULIUS H. KARLSON.